(12) United States Patent
Drda et al.

(10) Patent No.: US 10,483,854 B2
(45) Date of Patent: Nov. 19, 2019

(54) RESONANT POWER SUPPLY CONVERTER CIRCUIT AND METHOD THEREFOR

(71) Applicant: SEMICONDUCTOR COMPONENTS INDUSTRIES, LLC, Phoenix, AZ (US)

(72) Inventors: Vaclav Drda, Valasska Bystrice (CZ); Roman Stuler, Karolinka (CZ); Roman Mazgut, Zilina (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 71 days.

(21) Appl. No.: 15/600,282

(22) Filed: May 19, 2017

(65) Prior Publication Data

US 2018/0337607 A1 Nov. 22, 2018

(51) Int. Cl.
*H02M 3/335* (2006.01)
*H02M 1/088* (2006.01)
*H02M 1/08* (2006.01)
*H02M 1/00* (2006.01)

(52) U.S. Cl.
CPC ......... *H02M 3/33507* (2013.01); *H02M 1/08* (2013.01); *H02M 1/088* (2013.01); *H02M 3/3353* (2013.01); *H02M 2001/0032* (2013.01); *H02M 2001/0058* (2013.01)

(58) Field of Classification Search
CPC ......... H02M 3/33507; H02M 3/33569; H02M 2007/4815; H02M 1/08; H02M 1/088; H02M 3/3353; H02M 3/33659; H02M 2001/0032; H02M 2001/0058; Y02B 70/1433; Y02B 70/1441
See application file for complete search history.

(56) References Cited

U.S. PATENT DOCUMENTS

| | | | | |
|---|---|---|---|---|
| 4,178,549 | A * | 12/1979 | Ledenbach | H03M 5/00 340/5.8 |
| 7,239,119 | B2 | 7/2007 | Baurle et al. | |
| 9,520,795 | B2 | 12/2016 | Stuler et al. | |
| 2012/0014138 | A1* | 1/2012 | Ngo | H02M 3/33584 363/17 |
| 2016/0241150 | A1 | 8/2016 | Hsu et al. | |

OTHER PUBLICATIONS

NXP Semiconductors N.V., "TEA19161T, Digital controller for high-efficiency resonant power supply," Product Data Sheet, Rev. 1, Mar. 10, 2016, 46 pages.

* cited by examiner

*Primary Examiner* — Nguyen Tran
*Assistant Examiner* — Monica Mata
(74) *Attorney, Agent, or Firm* — Robert F. Hightower

(57) ABSTRACT

In one embodiment, a resonant converter circuit may be formed to include a light-load control circuit that forms a sequence to control one or more transistors wherein the sequence includes a drive interval having a drive pattern to drive the one or more transistors and a subsequent Off-interval wherein the one or more transistors are switched. A first circuit of the light-load control circuit may be configured to form the drive pattern as a repeated sequence of a pulse set that sequentially enables the one or more transistors with a base set followed by a number of non-switching intervals wherein each non-switching interval is a period of a signal formed in response to driving the one or more transistors with the base set.

20 Claims, 5 Drawing Sheets

RESONANT POWER SUPPLY CONVERTER CIRCUIT AND METHOD THEREFOR

CROSS-REFERENCE TO RELATED APPLICATIONS

This application is related to an application entitled "HYBRID CONTROL TECHNIQUE FOR POWER CONVERTERS," an application Ser. No. 15/148,200, having a common assignee, and common inventor Roman Stuler which was filed on May 6, 2016 and which is hereby incorporated herein by reference.

BACKGROUND OF THE INVENTION

The present invention relates, in general, to electronics, and more particularly, to semiconductors, structures thereof, and methods of forming semiconductor devices.

In the past, the electronics industry utilized various methods and structures to form resonant type power supply controller circuits. The resonant type power supply controller generally included a normal operating mode wherein the controller would operate with a frequency that varied and depended upon a load condition and the demagnetization characteristics of the resonant circuit that was driven by the control. In some embodiments, the amount of current required by the load that was supplied by the power supply controller may decrease which caused the power supply controller to operate at a lower frequency which in some cases could cause mechanical vibrations of the elements of the resonant circuit which resulted in an undesirable audible noise.

Accordingly, it is desirable to have a resonant type power supply controller that could operate with a reduced load, that reduces the amount of audible noise, and/or improves efficiency.

Figure 1:
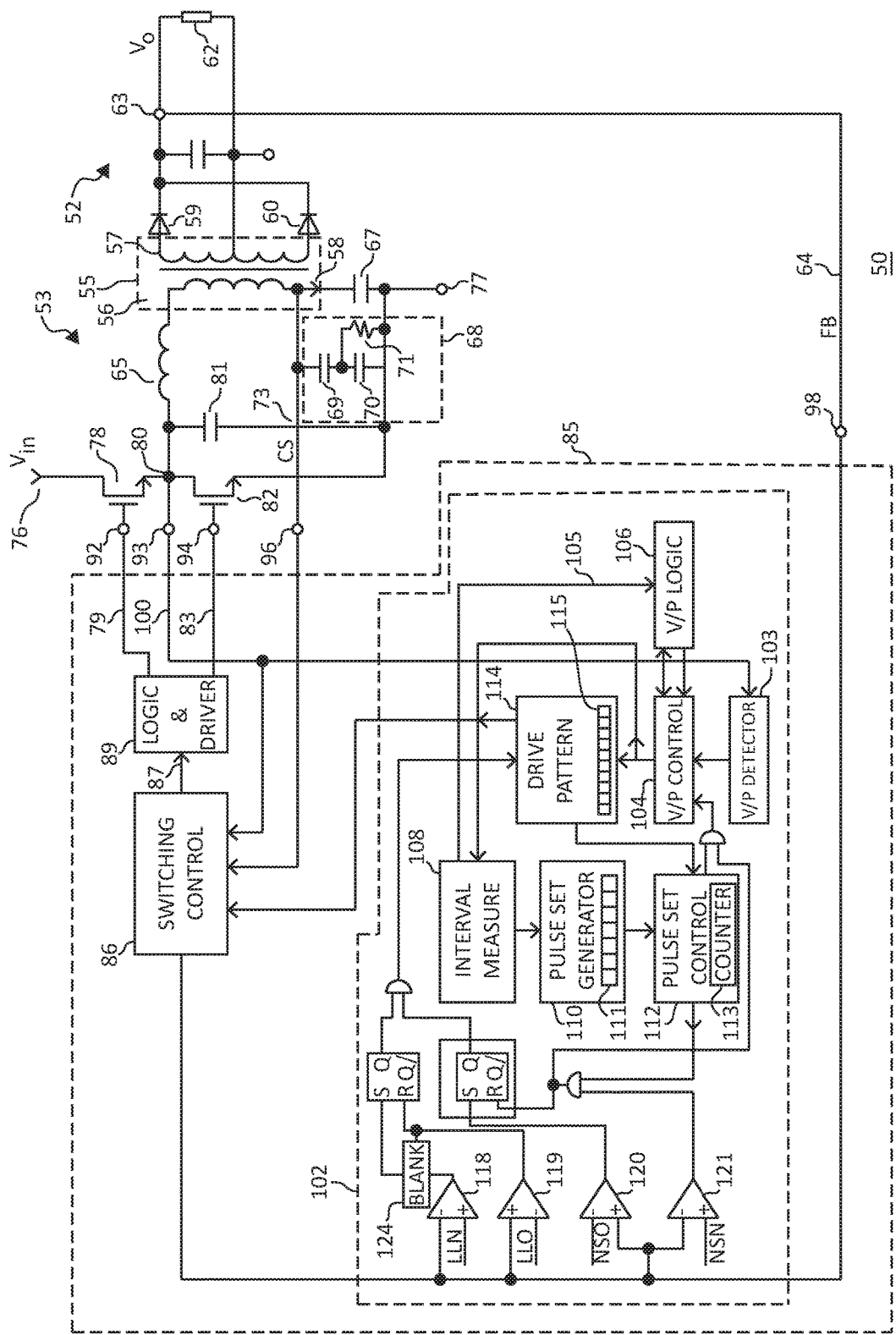
FIG. 1 schematically illustrates a portion of an example of an embodiment of a resonant LLC type power supply system having a power supply control circuit in accordance with the present invention.

For simplicity and clarity of the illustration(s), elements in the figures are not necessarily to scale, some of the elements may be exaggerated for illustrative purposes, and the same reference numbers in different figures denote the same elements, unless stated otherwise. Additionally, descriptions and details of well-known steps and elements may be omitted for simplicity of the description. As used herein current carrying element or current carrying electrode means an element of a device that carries current through the device such as a source or a drain of an MOS transistor or an emitter or a collector of a bipolar transistor or a cathode or anode of a diode, and a control element or control electrode means an element of the device that controls current through the device such as a gate of an MOS transistor or a base of a bipolar transistor. Additionally, one current carrying element may carry current in one direction through a device, such as carry current entering the device, and a second current carrying element may carry current in an opposite direction through the device, such as carry current leaving the device. Although the devices may be explained herein as certain N-channel or P-channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, that conductivity type does not refer to the doping concentration but the doping type, such as P-type or N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten percent (10%) (and up to twenty percent (20%) for some elements including semiconductor doping concentrations) are reasonable variances from the ideal goal of exactly as described. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein. Reference to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but in some cases it may. Furthermore, the particular features, structures or characteristics may be combined in any suitable manner, as would be apparent to one of ordinary skill in the art, in one or more embodiments.

The embodiments illustrated and described hereinafter suitably may have embodiments and/or may be practiced in the absence of or to be devoid of any element which is not specifically disclosed herein.

DETAILED DESCRIPTION OF THE DRAWINGS

FIG. 1 schematically illustrates a portion of an example of an embodiment of a resonant LLC type power supply system 50. System 50 includes a transformer 55 that divides system 50 into a secondary side 52 and a primary side 53. Transformer 55 includes a primary winding 56 and a secondary winding 57. Secondary side 52 may include one or more rectifiers, illustrated as diodes 59 and 60, and an output capacitor that forms an output voltage Vo supplied to a load 62. In some embodiments of one or more of the rectifiers may be implemented as transistors that are operated as synchronous rectifiers. In some embodiments, system 50 also includes a sensor circuit 63 that senses the value of output voltage Vo and supplies a feedback (FB) signal 64 that may be representative of the value of output voltage Vo. Sensor 63 may have various embodiments including an optical coupler that electrically isolates primary side 53 from secondary side 52. In other embodiment, sensor 63 may be formed by other techniques, for example such as an additionally winding of transformer 55 and in some embodiments may be obtained from elements on primary side 53. Primary side 53 includes a resonant inductor 65 and a resonant capacitor 67 connected to primary winding 56 to form a resonant LLC circuit. Primary side 53 may also include a high-side transistor 78 and a low-side transistor 82 that are connected together at a switch node or bridge node 80 that are switched in order to control the value of current 58 and output voltage Vo. An optional capacitor 81 may also be connected to node 80 to assist in providing a signal 100 as will be seen further hereinafter. A current sense circuit 68 may be utilized to sense the value of a primary current 58 that flows through transistor 78 and primary winding 56 and to provide a current sense (CS) signal 73 that is representative of information of the value of current 58. An embodiment may include that signal 73 may be formed to be representative of current 58. In an embodiment, signal 73 may be configured to represent an integration of current 58. For example, an embodiment may include that signal 73 is shifted in phase relative to current 58, such as for example shifted in phase approximately ninety degrees (90°). In an embodiment, the timing position of a substantially zero crossing of signal 73 may be representative of a timing position of a substantially peak value of current 58. An example embodiment of current sense circuit 68 may include current sense capacitors 69 and 70 connected in series with each other and in parallel with capacitor 67, and a resistor 71 that is connected in parallel with capacitor 70. Primary side 53 also receives an input voltage (Vin) between a voltage input 76 and a common return 77. An embodiment of the input voltage Vin may be a rectified DC voltage such as for example voltage resulting from a full wave rectified AC voltage.

A power supply control circuit 85 may also be included in primary side 53. Circuit 85 may be configured to switchingly control transistors 78 and 82 to regulate output voltage Vo to a desired value or target value within a range of values around the target value. For example, the target value may be five volts (5V) and the range of values may be plus or minus five percent (5%) around the five volts. Circuit 85 may include drive signal outputs 92 and 94 that are configured to be coupled to respective transistors 78 and 82 and to provide perspective drive signals 79 and 83 to alternately switch transistor 78 and 82 with substantially non-overlapping drive signals. For example, circuit 85 may be configured to form signals 79 and 83 such that there is substantially a small delay between negating one signal and enabling the other signal. Circuit 85 may also include a switch node or bridge node input 93 that is configured to receive a switch node signal or bridge node signal 100 from node 80, a current sense input 96 that is configured to receive CS signal 73, and a feedback (FB) input 98 that is configured to receive FB signal 64. Transistors 78 and 82 may be included as a portion of circuit 85 in some embodiments.

A switching control circuit 86 of circuit 85 may have an embodiment that is configured to receive signal 100 along with FB signal 64 and CS signal 73 and form a drive signal 87. A logic and driver circuit 89 may be configured to receive signal 87 and form the non-overlapping drive signals 79 and 83. Circuit 86 may have an embodiment that is configured to include circuits for operating transistors 78 and 82 in a resonant operating mode that may, in an embodiment, control enabling transistor 78 to provide current 58 and disabling transistor 78 in response to Vo reaching the desired value or alternately to a comparison between Vo and current 58 or alternately between FB signal 64 and CS signal 73, to subsequently enable transistor 82 to demagnetize transformer 55, and to subsequently disable transistor 82 in response to an on-time of transistor 82 substantially equaling the immediately prior on-time of transistor 78, and after a non-overlapping delay time re-enable transistor 78. In the resonant operating mode, circuit 85 may be configured to switch transistors 78 and 82 with a substantially fifty percent (50%) duty cycle. In other embodiments, transistor 82, thus the on-time thereof, may be terminated by the value of current 58 reaching substantially zero as detected by a zero crossing detection circuit.

Circuit 85 may also include a light-load control circuit 102 that may have an embodiment configured to provide control signals to circuit 86 to assist in operating circuit 85 in a light-load operating mode. An embodiment of circuit 102 may include a valley/peak (V/P) detector circuit 103, a valley/peak (V/P) control circuit 104, a valley/peak (V/P) logic circuit 106, a drive pattern circuit 114, an interval measurement circuit 108, a pulse set generator circuit 110, and a pulse set control circuit 112. Comparators 118-121 may be configured to detect various values of the output voltage, as represented by FB signal 64, and provide appropriate control signals that assist in operating circuit 102. Comparator 118 receives FB signal 64 and a Light-Load IN (LLN) reference signal from a reference signal generator (Not Shown). The LLN signal represents voltage Vo having a value greater than the desired value that, thus signal 64 having a value less than LLN, that may cause circuit 85 to operate in the light-load operating mode. Comparator 119 receives FB signal 64 and a Light-Load Out (LLO) reference signal from the reference signal generator. The LLO signal represents voltage Vo having a value less than the desired value that, thus signal 64 having a value greater than LLO, that may cause circuit 85 to exit the light-load operating mode and return to operating in the normal resonant operating mode. Comparator 120 receives FB signal 64 and a Non-Switching Out (NSO) reference signal from the reference signal generator. The NSO signal represents voltage Vo having a value during the light-load operating mode that is much less than the desired value that, thus signal 64 having a value greater than NSO, that may cause circuit 85 to operate in the light-load operating mode and to switch transistors 78 and 82 with a drive pattern to increase Vo closer to the desired value. Comparator 121 receives FB signal 64 and a Non-Switching IN (NSN) reference signal from the reference signal generator. The NSN signal represents voltage Vo having a value a little greater than the desired value that, thus signal 64 having a value less than LLN, that may cause circuit 85 to operate in the light-load operating mode and to not switch transistors 78 and 82 and allow Vo to decrease slightly.

Figure 2:
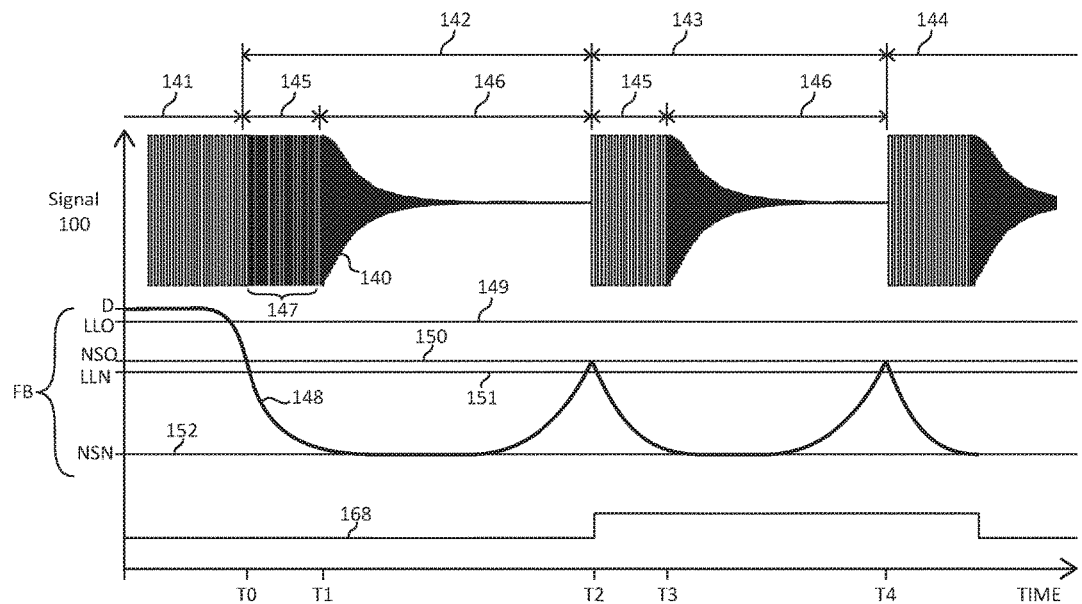
FIG. 2 is a graph illustrating in a general manner some signals that may be formed during an example of an embodiment of a method of operating an example embodiment of at least one of the circuits of FIG. 1 in accordance with the present invention.

FIG. 2 is a graph illustrating in a general manner some signals that may be formed during an example of an embodiment of a method of operating an example embodiment of circuit 85 or alternately circuit 102. The abscissa indicates time and the ordinate illustrates increasing values of the illustrated signals. A plot 140 illustrates signal 100, and a plot 148 illustrates FB signal 64. Lines or values 149-152 illustrate various values of FB signal 64 which correspond to the respectively labeled inputs of comparators 118-121. Line or value 149 represents the Light-Load Out (LLO) value, line or value 150 represents the Non-Switching Out (NSO) value, line or value 151 represents the Light-Load IN (LLN) value, and line or value 152 represents the Non-Switching IN (NSN) value. The Light-Load Out (LLO) value may be a value that represents a value of Vo that causes circuit 85 to exit the light-load operating mode and to return to operating in the normal resonant operating mode. The Non-Switching Out (NSO) value may be configured to be less than the LLO value and greater than the Light-Load IN (LLN) value, the LLN value may be configured to be greater than the Non-switching IN (NSN) value. As will be seen further hereinafter, a plot 168 illustrates a V/P control signal 105 that may be formed by circuit 108. This description has references to FIG. 1 and FIG. 2.

Circuit 85, or alternately circuit 102, is configured to form the light-load operating mode to include a sequence of sequential Light-Load (LLI) Intervals, such as intervals 142, 143, and 144 (illustrated in general by arrows), wherein the number of LLI intervals is controlled by the value of voltage Vo, as represented by FB signal 64. Circuit 85 may have an embodiment that is configured to form a Light-Load (LLI) Interval, such as anyone of intervals 142-144 to include a drive interval 145 (illustrated in general by an arrow) wherein controller 85 switchingly controls transistors 78 and 82 with the drive pattern, and an Off-Interval 146 (illustrated in general by an arrow) in which transistors 78 and 82 are not switched. In an embodiment, circuit 85, or alternately circuit 102, may be configured to form the drive pattern as a pulse set that includes a base set that sequentially enables transistors 78 and 82 and an optional number of non-switching intervals (NSWI) that correspond to cycles or periods of oscillations of signal 100 which are formed in response to driving transistors 78 and 82 with the base set.

Figure 3:
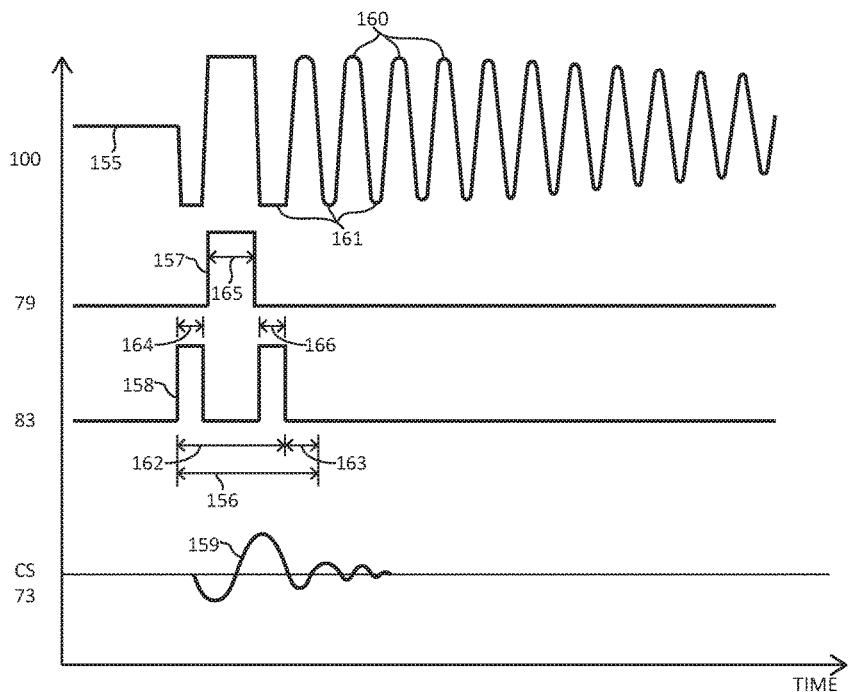
FIG. 3 is a graph illustrating in a general manner an enlarged view of some other signals that may be formed during an example of an embodiment of a method of forming an example of an embodiment of a pulse set for a drive interval formed by the circuit of FIG. 1 in accordance with the present invention.

FIG. 3 is a graph illustrating in a general manner an enlarged view of some other signals that may be formed during an example of an embodiment of a method of forming a pulse set 156 for drive interval 145 and driving transistors 78 and 82 with the resulting drive pattern. The abscissa indicates time and the ordinate indicates increasing value of the illustrated signals. A plot 155 illustrates signal 100, a plot 157 Illustrates drive signal 79 used for operating, such as for example enabling and disabling, transistor 78, and a plot 158 illustrates drive signal 83 used for operating, such as for example enabling and disabling, transistor 82. An asserted value of signals 79 and 83 may represent enabling the respective transistor and a negated value may represent disabling the respective transistor. A plot 159 illustrates CS signal 73. The signals illustrated in FIG. 3 are an example of an embodiment of one pulse set 156 that may be formed in the sequence of pulse sets that are used to drive transistors 78 and 82 in drive interval 145.

An embodiment of circuit 85, or alternately circuit 102, may be configured to form pulse set 156 to include a base set 162 and an optional Non-Switching Interval (NSWI) 163. An example embodiment of base set 162 may be configured to enable transistor 82 for a fixed time interval 164 (illustrated by an arrow), to thereafter enable transistor 78 for a time interval 165 (illustrated by an arrow) that is terminated in response to FB signal 64 or alternately a combination of signals 64 and 73, and to thereafter enable transistor 82 for a second time interval 166 (illustrated by an arrow). The duration of interval 166 may be formed to be a percentage of the duration of interval 165. For example, interval 166 may be formed to be approximately twenty five percent (25%) to approximately one hundred fifty percent (150%) of interval 165. The amount of the percent usually is selected to provide maximum ringing for signal 100 so that it is more easily detected. Alternately, interval 166 may be terminated by the substantially zero crossing of signal 73 as will be seen further hereinafter. An embodiment may include that in the event of not detecting a substantially zero crossing of signal 73, duration 166 may have a maximum value that is substantially equal to duration 165 or alternately limited to the selected percentage of the duration of interval 165. Circuit 102 (FIG. 1) may have an embodiment that may be configured to form pulse set 156 as a digital pattern that is provided to circuit 86 and circuit 86 may be configured to control the enabling and disabling of transistor 78 according to fixed values or according to the value of FB signal 64 or alternately signals 64 and 73, and the disabling of transistor 82 in response to the fixed time interval or alternately the substantially zero crossing of signal 73. Circuit 110 (FIG. 1) may be configured to form pulse set 156 for an embodiment of circuit 102. For example, circuit 110 may have an embodiment that may include a digital register 111 that holds a pattern as a digital word that is representative of the order and duration of the enablement interval and resulting disabling for drive signals 79 and 83 in order to form set 162 and interval 163. Circuit 110 may also be configured to control the number of pulse sets within interval 145 by the duration of interval 142 as will be seen further hereinafter.

Circuit 85, or alternately circuit 102, may be configured to form non-switching interval (NSWI) 163 as a number of cycles or periods of reverberation oscillations of signal 100 that are formed as a result of driving transistors 78 and 82 with base set 162. For example, V/P detector circuit 103 (FIG. 1) may be configured to receive signal 100 and detect peaks 160 and valleys 161 of the oscillations of signal 100. Circuit 103 may be configured to send signals to V/P control circuit 104 indicating the detection of each peak 160 and valley 161. Circuit 104 may be configured to count the number of peaks and the number of valleys and provide the number to V/P logic circuit 106. Circuit 106 may be configured to control the number of cycles or oscillation periods of signal 100 that are included in non-switching interval 163. As will be seen further hereinafter, an embodiment of circuit 85, or alternately circuit 102, may be configured to form the number of cycles of signal 100 within interval 163 in response to the duration of drive interval 145, or alternately in response to the duration of Off-interval 146, or alternately in response to both intervals 145 and 146. For example, an embodiment of circuit 108 may be configured to measure the duration of interval 142, and/or interval 145, and/or interval 146. The duration of one or more of these intervals may be used to adjust the duration of interval 163 or alternately the number of signal 100 cycles in interval 163, the number of pulse sets 156 in interval 145, and/or the duration of interval 146.

Figure 4:
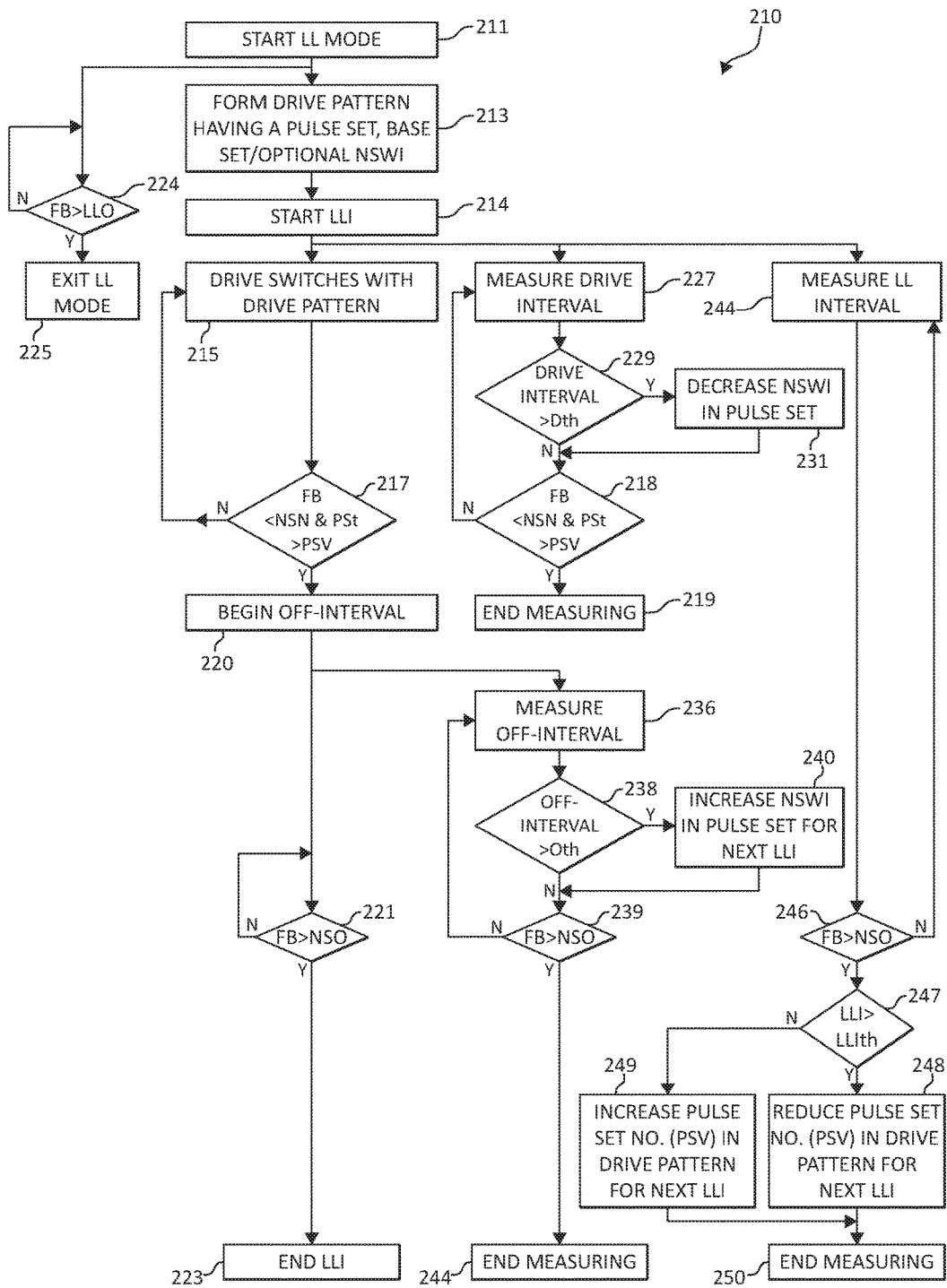
FIG. 4 is a flowchart that illustrates some steps in an example of a method of operating an example embodiment of at least one of the circuits of FIG. 1 in accordance with the present invention.

FIG. 4 is a flowchart 210 that illustrates some steps in an example of a method of operating an example embodiment of circuit 85, or alternately circuit 102, in a light-load operating mode. This description has references to FIGS. 1-4.

Referring to FIG. 2, assume that prior to a time T0, FB signal 64 is near the desired value (D) and circuit 85 is switchingly operating transistors 78 and 82 in the normal resonant operating mode as illustrated in a normal resonant operating mode 141 (illustrated in a general manner by an arrow). The switching of transistors 78 and 82 cause signal 100 to alternately increase and decrease around the value of return 77 as illustrated by plot 140.

Assume that at time T0, voltage Vo increases and FB signal 64 decreases to a value that is less than the Light-Load IN (LLN) value 151 that causes circuit 85 to transition from operating in the normal resonant operating mode 141 to begin operating in the light-load operating mode. Circuit 85, or alternately circuit 102, is configured to operate in the light-load operating mode by forming a sequence of Light-Load (LLI) Intervals, such as for example Light-Load (LLI) Intervals 142-144, that each include a drive interval 145 that has a drive pattern having pulse sets for driving transistors 78 and 82, and a subsequent Off-interval 146 wherein transistors 78 and 82 are not switched. At a step 211 of FIG. 4, circuit 85, or alternately circuit 102, begins operating in the light-load operating mode. In an embodiment, circuit 102 or circuit 110 may be configured to form the drive pattern and pulse sets while circuit 85 is operating in the normal resonant operating mode so that the pulse set was formed prior to entering the light-load mode at step 211. The pulse set may have been transferred to circuit 112, in an embodiment, which may maintain a count of the number of pulse sets to be generated, for example a Pulse Sets Value (PSV), such as for example in a counter 113 or alternately a register within circuit 112. Circuit 102 or alternately circuit 112 may also be configured to store a starting value for a Light-Load Interval threshold value (LLIth) that subsequently may be used for checking the duration of interval 142, as will be seen further hereinafter. The Light-Load threshold value (LLIth) may be selected to improve the performance of one or more features of system 50 (FIG. 1). For example, the LLITh value may be selected to assist in reducing audible noise such as by assisting in forming an equivalent frequency that would be less than a range of an audible frequency that can be heard by individuals. But if the LLIth value becomes too low, it may cause ripple in the output voltage Vo. Therefore, the LLIth value may be chosen to improve either of these elements or as a compromise to improve the performance of both features/elements. An embodiment of circuit 102 or alternately circuit 112 may also be configured to store a starting value for the number of pulse sets to be generated (PSV) in the current drive interval 145 as a starting value for the Pulse Set Value (PSV). The PSV may be stored in circuit 112 or register 113 for example. The starting value for the PSV value usually is selected to be a value to assist in reducing ripple in the output voltage or in reducing audible noise or both, such as is explained for the LLIth value. In other embodiments, the starting value for PSV may be set to an arbitrary number, such as for example 1 or 2 or 3 or 10, etc. The starting value will later be adjusted according to the operations as will be seen further hereinafter. In an embodiment, the starting value for PSV and LLIth may be entered into circuit 85 through one or more terminals (not shown) of circuit 85 through a software routine of other means. For example the values may be entered once the parameters of system 50, such as the inductance, capacitance, etc., parameters are known.

Circuit 110 may have also transferred the pulse set to drive pattern circuit 115 which forms control signals to switching control circuit 86 that generates the actual switching patterns for signals 79 and 83. In an embodiment, circuit 85, or alternately circuits 102 or 110 and 114, may be configured to form a drive pattern having a pulse set such as for example pulse set 156, at a step 213. Because this is the first drive interval 145 in the first light-load (LLI) interval 142 of the light-load operating mode, circuit 85, or alternately circuits 102 or 110, forms pulse set 156 to include only base set 162. In another embodiment the first drive interval 145 of the first interval 142 can alternatively include more than one base set or a different base set, as will be seen further hereinafter.

At a step 214, circuit 85 or alternately circuit 102 begins light-load interval 142. At a step 215, circuit 85 begins to drive switches, such as transistors 78 and 82, with pulse set 156 to form the drive pattern. Circuit 102, such as for example circuit 103, may be configured to detect peaks 160 and valleys 161 (FIG. 2) of signal 100 form as a result of the previous driving of transistors 78 and 82 during the last cycle of the resonant operating mode, and enable transistor 78 at a peak value 160 or alternately may enable transistor 82 at a valley value 161. Enabling at either a peak or valley value results in switching with a substantially zero voltage value across the respective transistor that is being enabled. From step 215, circuit 102 continues to issue a sequential series of pulse sets 156 until a combination of the number of actual pulse sets (PSt) sent to transistors 78 and 82 is at least equal to the Pulse Set Value (PSV) and also until Vo increases to a value, typically a value greater than the desired value, as represented by FB signal 64 decreasing to no greater than the Non-Switching IN (NSN) value at a step 217. For example, circuit 85 may be configured to drive transistors 78 and 82 with the drive pattern of pulse set 156 if FB signal 64 is greater than value 152 (FIG. 2) or if the number of pulse sets actually issued (PSt) by circuit 102 or circuit 85 to transistors 78 and 82 is less than PSV. In response to the combination of PSt becoming no less than PSV and to FB signal 64 reaching NSN value 152 at step 217, circuit 85 is configured to terminate switching of transistors 78 and 82 and prepare for operating in Off-interval 146 in which transistors 78 and 82 are not switched.

In parallel and beginning at a step 244, circuit 85 begins to measure the duration of the Light-Load Interval (LLI), such as interval 142. For example, circuit 108 (FIG. 1) may include a timer or counter circuit that measures the duration of each light-load interval, such as interval 142.

Also proceeding from step 214 and beginning at a step 227 and in parallel with steps 215 and 217, circuit 85 may be configured to begin measuring the duration of drive interval 145. For example, circuit 108 at a step 229 may be configured to determine if the duration of interval 145 is greater than a drive-interval threshold (Dth) value. If it is greater, at a step 231 circuit 108 may be configured to send signal 105 to circuit 110 and/or circuit 106 to decrease the number of intervals 163. An embodiment may include that circuit 85, or circuit 102, may be configured to decrease the number of NSWI in the next pulse set used in drive interval 145 for the current interval 142. Alternately, circuit 85 may be configured to delay and adjust the number used in a subsequent light-load interval, such as for example interval 143, that follows interval 142. An embodiment of circuit 85 may be configured to detect the duration of interval 145 exceeding multiples of the duration of the Drive-threshold (Dth) and adjust the number of intervals 163 by the same multiple decrements, for example two or three decrements instead of one decrement. In an embodiment, circuit 102 may be configured to adjust the number of intervals 163 in response to detecting that the duration of interval 145 is greater than the drive threshold value (Dth). Decreasing the number of NSWI for the next pulse set in the current drive interval 145 assists in maintaining the duration of interval 145 less than the desired threshold value and assists in reducing audible noise, etc. Alternately, circuit 102 may be configured to decrease the number of NSWI subsequent to or substantially simultaneously with terminating Drive interval 145, or alternately terminating Off-interval 146. At a step 218, circuit 85, or circuit 102, may be configured to terminate the drive interval as explained previously for step 217. Those skilled in the art will appreciate that in some embodiments, step 218 may be the same step as step 217 and that step 218 is illustrated to provide proper continuity to assist in understanding the method and simplifying the complexity of chart 210.

Proceeding from step 217, at step 220 circuit 85, or alternately circuit 102, may be configured to begin forming Off-interval 146. At a step 221, circuit 85, or alternately circuit 102, continues to maintain the Off-interval until the value of Vo decreases to a value less than the desired value as illustrated by FB signal 64 increasing to no less than the Non-Switching Out (NSO) value that is represented by value 150 in FIG. 2. Also proceeding from step 220 and in parallel with steps 220 and 221, at a step 236 circuit 85, or alternately circuit 102, may be configured to measure the duration of Off-interval 146. For example, circuit 108 (FIG. 1) may include another timer or counter circuit that measures the duration of the Off-interval, such as interval 146. At a step 238, circuit 85 may be measuring the duration of interval 146 to determine if the duration is greater than an Off-threshold (Oth) value. If the duration is greater than the Off-Threshold (Oth) value, circuit 85, or alternately circuit 108, may be configured to send signal 105 (Plot 168 of FIG. 2) to circuit 110 and/or circuit 106 to increase the number of intervals 163 in pulse set 156 for the next drive interval 145 of the next Light-Load Interval (LLI), such as for example interval 143 or 144 as illustrated at a step 240. An embodiment of circuit 85 may be configured to detect the duration of interval 146 exceeding multiples of the duration of the Off-threshold (Oth) and adjust the number of intervals 163 by the same multiple increments, for example two or three increments instead of one increment. Circuit 85, or circuit 102, continues to measure the duration of interval 146 until circuit 85, or alternately circuit 102, terminates Off-interval 146 at step 221. Those skilled in the art will appreciate that step 239 may be the same step as step 221 and that the condition terminates measuring the Off-interval as well as ending the current LLI interval, such as for example interval 142.

An embodiment of circuit 85 may be configured to increase the number of non-switching intervals (NSWI) 163 if the duration of Off-interval 146 is greater than the Off-threshold (Oth) value, or alternately may be configured to decrease the number of intervals 163 if the duration of drive interval 145 is greater than the drive-threshold (Dth) value or alternately adjust by both threshold values. The values used for the off-threshold (Oth) and the drive-threshold (Dth) usually are determined by the parameters of the elements used to form the resonant circuit of system 50. For example, the drive-threshold (Dth) may be selected so that the duration of interval 145 may be set, or the off-threshold (Oth) may be selected so that the duration of interval 146 may be set to provide desired operation based on the parameters of the components external to circuit 85, such as for example the capacitances and inductances of the external components. In one example embodiment, the duration of the off-threshold was approximately five milli-seconds (5 msec.) and the drive threshold was approximately fifteen milli-seconds (15 msec.).

Proceeding from step 244 and in parallel with other steps of the Light-Load Interval from step 214, circuit 85, or alternately circuit 102 or 108, may be configured to measure the duration of each Light-Load Interval (LLI), such as for example interval 142 or 143 or 144. For example, circuit 108 (FIG. 1) may include a timer or counter circuit that measures the duration of each Light-Load Interval (LLI), such as interval2 142-144. At step 244, circuit 85, or alternately circuit 102, measures the duration of the Light-Load Interval, such as interval 142 for example. At step 246, if circuit 85, or alternately circuit 102, has terminated the Light-Load Interval, such as illustrated at a step 221, circuit 85 or alternately circuit 102 may be configured, at a step 247, to determine if the LLI duration, such as the duration of interval 142 for example, is less than the Light-Load Interval threshold (LLIth) value. As explained hereinbefore, the Light-Load threshold value may be selected to improve the performance of one or more features of system 50 (FIG. 1). For example, the LLITh value may be selected to assist in reducing audible noise a such as by assisting forming an equivalent frequency that would be less than a range of an audible frequency that can be heard by individuals. But if the LLIth value becomes too low, it may cause ripple in the output voltage Vo. Therefore, the LLIth value may be chosen to improve either of these elements or as a compromise to improve the performance of both features/elements. For example, the audible frequency may be any frequency greater than approximately one kilo-hertz (1 KHz). In some embodiments the frequency may be selected to be any frequency greater than approximately eight hundred hertz (800 Hz) or alternately any frequency between approximately one kilo-hertz (1 KHz) and approximately eight hundred hertz (800 Hz). If the duration of the Light-Load Interval is less than the LLIth value, circuit 85, or alternately circuit 102, may be configured to increase the number of pulse sets 156 in interval 145 for the next light-load interval, such for interval 143 or 144 for example, at a step 249. For example, circuit 102 or alternately circuit 112 may be configured to increase the value of PSV. Conversely, if the duration of the Light-Load Interval is approximately no less than the LLIth value, circuit 85, or alternately circuit 102, may be configured to decrease the number of pulse sets 156 in interval 145 for the next light-load interval for example as illustrated at a step 248. For example, circuit 102 or alternately circuit 112 may be configured to decrease the value of PSV. Circuit 108 may include an embodiment that may be configured to send a signal to circuit 110 causing circuit 110 to increase or decrease the number of pulse sets 156 used to switch transistors 78 and 82 during the next drive interval 145, such as interval 145 in interval 143 or 144. Increasing the number of pulse sets increases the energy delivered to load 62 (FIG. 1) which results in decreasing the frequency and decreasing the duration of the next light-load interval, such as interval 143 and vice versa. Those skilled in the art will appreciate that in some embodiments, step 246 may be the same step as step 221 and that step 239 or step 246 is illustrated to provide proper continuity to assist in understanding the method and simplifying the complexity of chart 210.

Circuit 85, or alternately circuit 102 or circuits 108, 110, and 106, may be configured to adjust the number of intervals 163 within the pulse set in response to the duration of a previous drive interval or previous Off-interval, and also adjust the number of pulse sets within a drive interval 145 in response to the duration of a previous Light-Load Interval. In an embodiment, the adjustments may be made substantially simultaneously with circuit 85 terminating a light-load interval, such as for example interval 142, and before initiating a subsequent light-load interval, such as interval 143 for example. In an embodiment, circuit 85 or circuit 102 may be configured to decrease the number of NSWI for an immediately following pulse set in a current drive interval, such as for example interval 145 of a current LLI.

Referring back to FIG. 2, at time T2 circuit 85 initiates a subsequent light-load interval 143 during operating in the light-load operating mode in response to voltage Vo again decreasing to a value less than the desired value as indicated in FIG. 2 by FB signal 64 increasing to the Non-Switching Out (NSO) value 150. The NSO value represents a value of Vo that indicates circuit 85 should again switch transistors 78 and 82 to provide power to load 62 (FIG. 1). Circuit 85, or alternately circuit 102 or circuits 108 and/or 110, has adjusted the number of intervals 163 in pulse set 156 according to the values of from interval 142 that represent the duration of either or both of drive interval 145 and/or Off-interval 146 (such as for example increased as illustrated by plot 168 representing signal 105), and has additionally adjusted the number of pulse sets 156, for example by adjusting PSV, to be issued in drive interval 145 for this light-load interval 143 in response to the duration of the previous light-load interval 142. Thus, circuit 85, or alternately circuit 102, is configured to operate transistors 78 and 82 with the drive pattern formed by repeated sequences of the adjusted configuration of pulse set 156 including additions or removal of intervals 163, and the adjusted number of pulse sets for interval 145, followed by Off-interval 146. In an embodiment, the number of NSWI 163 may be decreased for the very next pulse set in the current drive interval in response to the value of interval 145 being greater than the drive threshold value, for example as illustrated by step 231 of chart 210. The adjusted number of pulse sets in drive interval 145, such as for example the PSV value, for this light-load interval 143 was adjusted, in response to the duration of previous interval 142, to maintain the duration of the LLI interval less than the LLIth value. Circuit 85 is configured to again, during interval 143, measure the duration of interval 145 and interval 146 as illustrated in flowchart 210 and prior to initiating a subsequent light-load interval, such as interval 144, adjust the number of intervals 163 in the pulse set as illustrated in flowchart 210. Circuit 85, or alternately circuit 102, is also configured to measure the duration of interval 143 and adjust the number of pulse sets in the subsequent interval 145 of the subsequent light-load interval, such as interval 144, to maintain the frequency as illustrated in flowchart 210. For example, circuit 85 or alternately circuit 102 may be configured to adjust the PSV value, for example as stored in circuit 112.

Figure 5:
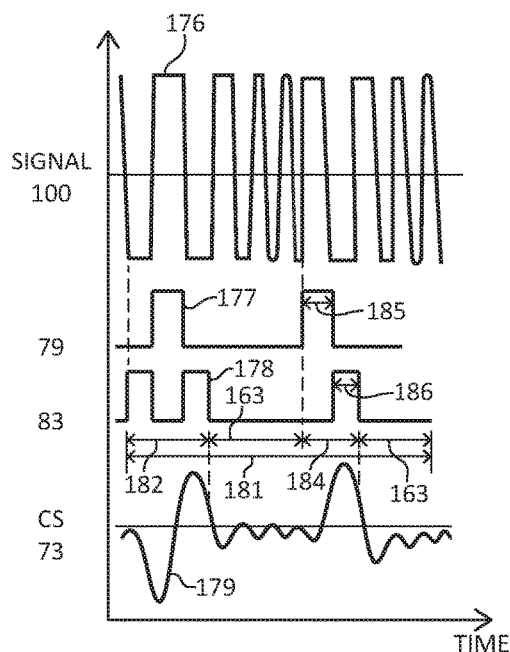
FIG. 5 is a graph illustrating some signals that may be formed during an alternate embodiment of a method of operating an example embodiment of at least one of the circuits of FIG. 1 in accordance with the present invention.

FIG. 5 is a graph illustrating some signals that may be formed during an embodiment of a method of operating circuit 85, or alternately circuit 102, according to an example of an embodiment of circuit 85. The abscissa indicates time and the ordinate indicates increasing value of the illustrated signal. A plot 176 illustrates an example of signal 100, a plot 177 illustrates an example of drive signal 79, a plot 178 illustrates an example of drive signal 83, and a plot 179 illustrates an example of CS signal 73. An embodiment of circuit 85, or alternately circuit 102 or 110, may be configured to form a pulse set 181 that may have an embodiment that is an alternate embodiment of pulse set 156. Circuit 85, or alternately circuit 102, may be configured to form pulse set 181 to a base set 182 that includes a pattern that switches transistors 78 and 82 with two sets of pulses thus base set 182 may include a first set 183 followed by an optional NSWI 163 and a second set 184 followed by another optional NSWI 163. In an embodiment, first set 183 may be substantially the same as base set 162. Pulse set 181 facilitates increased ringing of signal 100 so that more peaks/valleys can be skipped if required. This type of pulse set also provides better symmetry of the voltage on capacitor 67.

First set 183 may be formed and the durations controlled as discussed hereinbefore for base set 162. Set 184 may be formed to include a pattern that is configured to enable transistor 78 for a duration 185 followed by enabling transistor 82 for a duration 186. Duration 185 may be formed in the same manner as duration 165 and duration 186 may be formed in the same manner as duration 166. Pulse set 181 may be used instead of pulse set 156 in the operation of circuit 85 or circuit 102 as explained in the description of FIGS. 1-4.

In order to facilitate the herein before described operation, an inverting input of comparator 121 is commonly connected to input 98 to receive FB signal 64, to a non-inverting input of comparator 120, to a non-inverting input of comparator 119, to an inverting input of comparator 118, and to an input of circuit 86. A non-inverting input of comparator 121 is connected to receive the NSN signal, and an output of comparator 121 is connected to a first input of an AND gate. An inverting input of comparator 120 is connected to receive the NSO signal, and an output is connected to a set input of a latch. An inverting input of comparator 119 is connected to receive the LLO signal, and an output is connected to an input of a blanking or blank circuit 124 and to a reset input of the second latch. A non-inverting input of comparator 118 is connected to receive the LLN signal, and an output is connected to another input of circuit 124. An output of circuit 124 is connected to a set input of the second latch. A Q output of the second latch is connected to a first input of the second AND gate. A Q output of the first latch is connected to a second input of the second AND gate. An output of the second AND gate is commonly connected to an input of circuit 108 and an input of circuit 114. A first output of register 108 is connected to form signal 105 and to an input of circuit 106. A second output of register 108 is connected to an input of circuit 110. One or more outputs of circuit 110 may be connected to one or more inputs of circuit 112. An output of circuit 112 is connected to a second input of the first AND gate. An output of the first AND gate is commonly connected to a reset input of the first latch and to a first input of a NAND gate. A second output of circuit 112 is connected to a second input of the NAND gate which has an output connected to an input of circuit 104. One or more outputs of circuit 114 are connected to one or more inputs of circuit 86. Another output of circuit 114 is connected to another input of circuit 112. Circuit 103 has an input connected to input 93 in order to receive signal 100 and is also connected to another input of circuit 86. An output of circuit 103 is connected to an input of circuit 104. Another input of circuit 104 is connected to an output of circuit 106. One or more inputs or outputs of circuit 104 are connected to one or more inputs or outputs of circuit 106. Another output of circuit 104 is commonly connected to an input of circuit 114 and to an input of circuit 108. Circuit 86 has another input connected to input 96 to receive the CS signal. Circuit 86 has an output connected to an input of circuit 89 to provide signal 87 to circuit 89. Circuit 89 has a first output configured to form signal 79 and configured to connect to output 92 and configured to be connected to a gate of transistor 78. A second output of circuit 89 is configured to form signal 83 and connected to output 94 to be connected to a gate of transistor 82.

Figure 6:
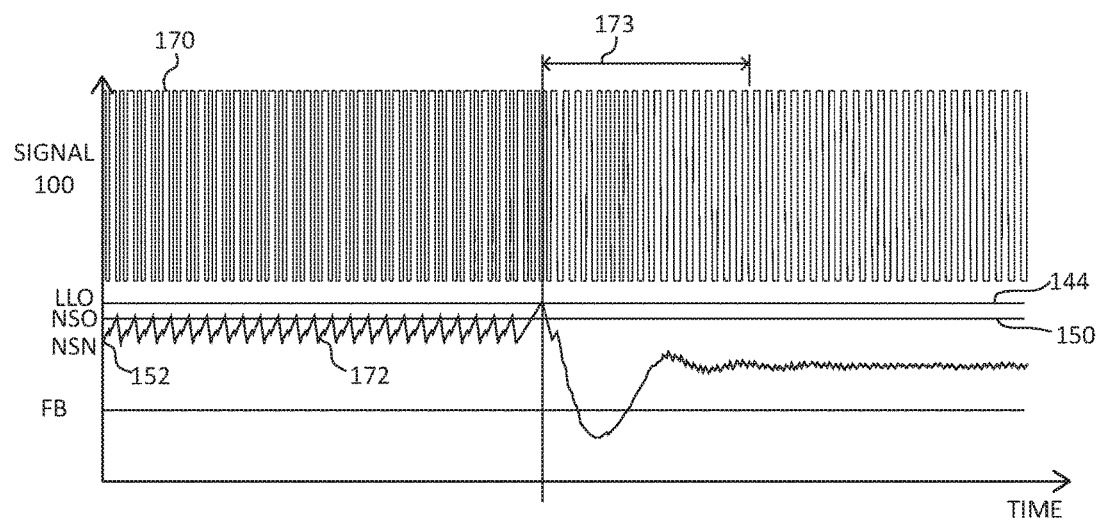
FIG. 6 is a graph having plots that illustrate some of the signals that may be formed as a result of an embodiment of a method of operating an example embodiment of at least one of the circuits of FIG. 1 during a transition from a light-load operating mode back to the normal resonant operating mode in accordance with the present invention.

FIG. 6 is a graph having plots that illustrate some of the signals that may be formed as a result of an embodiment of a method of operating an example embodiment of circuit 85 during a transition from the light-load operating mode back to the normal resonant operating mode. In response to voltage Vo decreasing to a value that is less than the desired value and requires increased power to be supplied to the load, as represented by FB signal 64 increasing to the light-load out (LLO) value 149 (FIG. 2), circuit 85 may be configured to blank out or ignore the effect of the value of voltage Vo, thus FB signal 64, from detecting a light-load operating mode. For example, Circuit 85, or alternately circuit 102, may be configured to inhibit the FB signal from affection circuit 102 or alternately comparator 118 for some number of switching periods to reduce the possibility of false triggering resulting from possible variations of FB signal 64 during the transition. The FB signal and the effects thereof are not blanked from circuit 86 so that circuit 86 may continue to control operation in the normal resonant operating mode. For example, circuit 85 may be configured to change gain parameters of some of the control circuits, such as amplifier gains, in circuit 86 in order to facilitate again operating in the resonant operating mode. Blanking out or ignoring the value of FB signal 64 for a blanking time interval 173 facilitates a smooth transition from the light-load operating mode to the normal resonant operating mode and allows time for the gain change of the amplifiers. Thus, during interval 173, circuit 85 is configured to enable transistors 78 and 82 as described for operation in the normal resonant operating mode.

Figure 7:
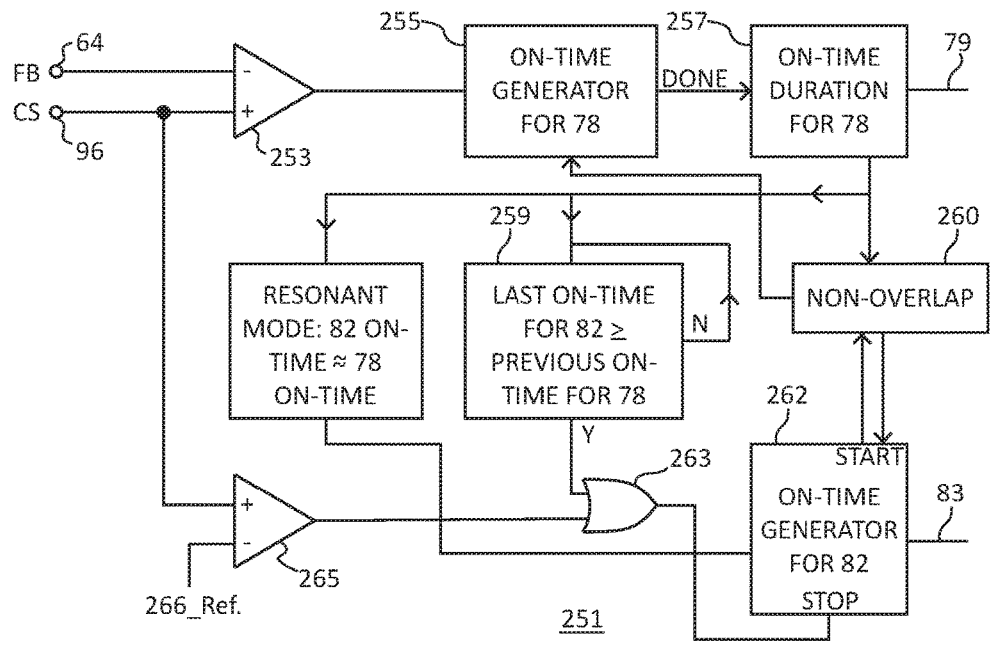
FIG. 7 schematically illustrates an example of a portion of an embodiment of a switching control circuit that may have an embodiment that may be an alternate embodiment of a portion of at least one of the circuits of FIG. 1 in accordance with the present invention.

FIG. 7 schematically illustrates an example of a portion of an embodiment of a switching control circuit 251 that may have an embodiment that may be an alternate embodiment of a portion of circuit 86 and/or of circuit 89 (FIG. 1). An embodiment of circuit 251 may be configured to control transistors 78 and 82 to operate circuit 85 or alternately system 50 (FIG. 1) in the Light-Load Operating mode. C Circuit 215 may also have an embodiment wherein some portions may be used to assist in operating transistors 78 and 82, and circuit 85 or alternately system 50 in the resonant operating mode. In an embodiment of the Light-Load operating mode, transistor 78 may be enabled in response to circuit 85 detecting signal 73 becoming zero or substantially zero during an interval that transistor 82 was enabled. In most embodiments, circuit 85 or alternately circuit 251, in response to signal 73 becoming substantially zero, may cause transistor 82 to be disabled followed by enabling transistor 78 after the non-overlapping interval. Circuit 85 may be configured to subsequently disable transistor 78 in response the peak value of voltage Vo and the peak value of current 58 through transistor 78 reaching a desired value. Thus, the frequency and/or the duty cycle at which transistors 78 and 82 are switched may vary depending on the operation of load 62 (FIG. 1). Circuit 251 includes an error amplifier 253, a zero crossing detection (ZCD) circuit such as a comparator 265 that is configured to detect a zero crossing of signal 73, an On-time generator circuit for generating the on-time of transistor 78, an on-time generator 262 for generating the on-time of transistor 82, a non-overlap control circuit 260, and an on-time control circuit 259 for assisting in controlling the on-time of transistor 78. Amplifier 253 may be configured to receive FB signal 64 and CS signal 73. Comparator 265 is configured to receive CS signal 73 and detect when the value of signal 73 is substantially zero or alternately near zero, and responsively cause circuit 262 to disable transistor 82. Circuit 260 detects the disabling of transistor 82 and responsively forms a non-overlap time interval and subsequently causes circuits 255 and 257 to enable transistor 78. Amplifier 253 is configured to receive CS signal 73 and FB signal 64 and reset circuit 255 and cause circuit 257 to disable transistor 78 in response to the values of signals 64 and 73. Non-overlap circuit 260 is configured to subsequently cause circuit 262 to re-enable transistor 82 after a non-overlap delay.

An embodiment of circuit 251 may also include a resonant switching mode circuit 268 that may assist in controlling the operation of transistors 78 and 82 in the resonant operating mode, as is described hereinbefore.

In order to facilitate the foregoing operation, a first input of circuit 251 is connected to receive FB signal 64 and connected to an inverting input of amplifier 253 which has a non-inverting input connected to receive the CS signal and to a non-inverting input of comparator 265. An output of amplifier 253 is connected to an input of a circuit 255. Another input of circuit 255 is conned to an output of circuit 260. An output of circuit 255 is connected to an input of circuit 257. An output of circuit 257 is connected to an input of circuit 260 and to an input of circuit 259. Another output of circuit 260 is connected to a start input of circuit 262. Another input of circuit 260 is connected to another output of circuit 262. An output of circuit 259 is connected to a first input of an OR gate 263. A second input of OR gate 263 is connected to an output of comparator 265.

Figure 8:
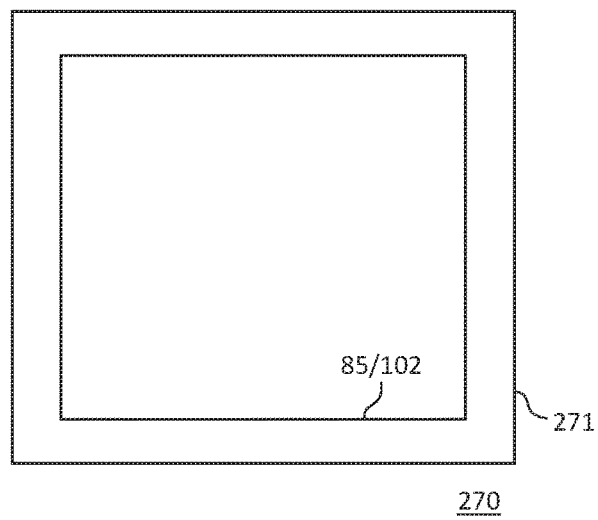
FIG. 8 illustrates an enlarged plan view of a semiconductor device that includes some of the circuits of FIG. 1 in accordance with the present invention.

FIG. 8 illustrates an enlarged plan view of a portion of an embodiment of a semiconductor device or integrated circuit 270 that is formed on a semiconductor die 271. In an embodiment, any one of circuits 85 or 102 may be formed on die 171. Die 171 may also include other circuits that are not shown in FIG. 8 for simplicity of the drawing. The circuit and device or integrated circuit 170 may be formed on die 171 by semiconductor manufacturing techniques that are well known to those skilled in the art.

From all the foregoing, one skilled in the art will understand that an example of an embodiment of a method of forming a resonant mode power supply control circuit may comprise:

configuring the resonant mode power supply control circuit to switchingly control a high-side transistor and a low-side transistor to regulate an output voltage delivered to a load wherein the high-side transistor and the low-side transistor both have a current conducting electrode coupled together at a half-bridge node wherein the half-bridge node is configured for coupling to an inductor;

configuring a switching control circuit, such as for example circuit 8,5 to form one or more drive signals, such as for example one or more of signals 87, 79, or 78, to switch the high-side transistor and the low-side transistor in a normal operating mode, such as for example a resonant operating mode, in response to a first value, such as for example the value represented by value LLO, of the output voltage and to control the high-side and low-side transistors in a light-load operating mode in response to a second value, such as for example a value representative of value LLN, and of the output voltage wherein the first value is greater than the second value and wherein the switching control circuit forms the light-load operating mode to include one or more sequences of a drive interval, such as for example interval 145, wherein the one or more drive signals are formed to switch the high-side and low-side transistors, followed by an Off-interval, such as for example interval 146, wherein the high-side and low-side transistors are not switched;

configuring a light-load control circuit, such as for example circuit 102, to generate a drive pattern having one or more pulse sets, such as for example set 156 or 181, and wherein each pulse set is formed to enable the low-side transistor for a substantially fixed time interval, subsequently enable the high-side transistor for a second time interval determined by the output voltage, and subsequently enable the low side transistor for a third time interval formed to be one of proportional to the second time interval or in response to a substantially zero value of a current sense signal; and configuring the light-load control circuit to measure a duration of the drive interval and the Off-interval and to adjust a number of pulse sets in a subsequent drive pattern for a subsequent drive interval in response to the duration.

The method may also have an embodiment that may include configuring the light-load control circuit to adjust the number of pulse sets for an immediately subsequent drive interval.

Another embodiment may include configuring the light-load control circuit to increase the number of pulse sets in the subsequent drive interval in response to the duration having a value less than a Light-Load Threshold value.

An embodiment may include configuring the light-load control circuit to detect peaks and valleys of an HB signal, such as for example signal 100, formed at the half-bridge node and to generate a non-switching time interval, such as for example interval 163, between two adjacent pulse sets wherein the non-switching time interval is substantially equal to one or more cycles of a peak-to-valley oscillation of the HB signal.

Another embodiment may include configuring the light-load control circuit to form a non-switching interval between pulse sets by counting one or more peaks and valleys formed by an HB signal, such as for example signal 100*d* at the half-bridge node in response to the one or more pulse sets.

In an embodiment, the method may also include configuring the light-load control circuit to adjust a number of non-switching intervals, such as for example interval 163, between pulse sets in response to a duration of one of the drive interval or the Off-interval.

The method may also have an embodiment that may include configuring the light-load control circuit to increase the number of non-switching intervals between pulse sets in response to the Off-interval having a duration greater than an Off-threshold value, such as for example the Oth value.

Another embodiment may include configuring the light-load control circuit to decrease the number of non-switching intervals between pulse sets in response to the drive interval having a duration greater than a Drive-threshold value.

An embodiment may include configuring the light-load control circuit to inhibit initiating the light-load operating mode for a blanking time interval, such as for example interval 173, in response to the output voltage increasing from near the second value to a third value, such as for example as represented by the value LLO, that is less than the first value, such as for example a desired value, and greater than the second value.

The method may also have an embodiment may include configuring the light-load control circuit to form the drive pattern as a digital word that represents a pulse set of the one or more pulse sets.

Those skilled in the art will also appreciate that an example of an embodiment of a circuit for controlling a light-load operation of a resonant converter circuit may comprise:

the resonant converter circuit configured to drive one or more transistors connected to an inductor to control a current, such as for example current 58, through the inductor and form an output voltage to a load wherein the inductor and the one or more transistors are connected together at a bridge node, such as for example node 80, wherein a bridge signal, such as for example signal 100, is formed at the bridge node by switching of the one or more transistors;

a pulse set generator circuit, such as for example circuit 110, configured to form a digital, such as for example in register 111, representation of a pulse set, such as for example pulse set 156 or 181, for operating the one or more transistors including forming the pulse set to cause switching of the one or more transistors at least once;

a drive pattern circuit, such as for example circuit 114, configured to form a drive signal, such as for example signal 87, to switchingly drive the one or more transistors during a drive interval, such as for example interval 145, with a repeated sequence of the pulse set in response to an output parameter of one of the output voltage or power delivered to the load being no greater than a first value, such as for example the power or the output voltage having a value represented by value LLN, and greater than a second value, such as the value represented by the value NSN, that is less than the first value;

the drive pattern circuit configured to form an Off-interval, such as for example interval 146, of the drive signal by not switching the drive signal in response to the output parameter being no greater than the second value and to subsequently switchingly drive the one or more transistors in response to the output parameter being greater than a third value, such as for example value represented by the value NSO, wherein the third value is less than the first value and greater than the second value; and the pulse set generator circuit configured to form one or more non-switching intervals, such as for example intervals 163, between each pulse set in response to a duration of one of the drive interval or the Off-interval.

Another embodiment may include that the pulse set generator circuit may be configured to form the one or more non-switching intervals in response to a duration of the drive interval and in response to a duration of the Off-interval.

In an embodiment, the pulse set generator circuit may be configured to adjust a number of the non-switching intervals for each drive interval.

An embodiment may include a detector circuit, such as for example circuit 103, to detect one of peaks or valleys of the bridge signal, and wherein the pulse set generator circuit is configured to form the one or more non-switching intervals to be substantially equal to one or more periods of the bridge signal.

In an embodiment, the peaks or valleys of the bridge signal may be formed in response to driving the one or more transistors with the pulse set.

Another embodiment may include a measurement circuit, such as for example circuit 108, configured to measure a duration of the drive interval and the Off-interval wherein the measurement circuit is configured to increase a number of pulse sets in the drive interval in response to the duration having a value less than a Light-Load threshold value, such as for example the LLITh value.

Those skilled in the art will also appreciate that an example of an embodiment of a method of forming a resonant converter circuit may comprise:

configuring a light-load control circuit, such as for example circuit 102, to, during a light-load operating mode, control driving of one or more transistors to form an output parameter of one of an output voltage for a load or power delivered to the load wherein the one or more transistors are connected to an inductor at a switch node, such as for example node 80;

configuring the light-load control circuit to form a sequence to control the one or more transistors wherein the sequence includes a drive interval having a drive pattern and a subsequent Off-interval wherein the one or more transistors are switched with the drive pattern during the drive interval and are not switched during the Off-interval; and configuring a first circuit, such as for example circuit 114, of the light-load control circuit to form the drive pattern as a repeated sequence of a pulse set, such as for example pulse set 156 or 181, that sequentially enables the one or more transistors with a base set, such as for example set 62 or 182/184, followed by a number of non-switching intervals, such as for example intervals 163 wherein each non-switching interval is a period of a signal, such as for example signal 100, received from the switch node in response to driving the one or more transistors with the base set.

An example of another embodiment of the method may also include configuring the light-load control circuit form the pulse set to sequentially enable the one or more transistors at least once.

Another embodiment may include configuring the light-load control circuit to form the number of non-switching intervals in response to a duration of the drive interval or a duration of the Off-interval.

In an embodiment, the method may include configuring the light-load control circuit to form a number of the pulse set in the drive pattern in response to a duration of an immediately previous sequence.

In view of all of the above, it is evident that a novel device and method is disclosed. Included, among other features, is forming a power supply control circuit to form a light load operating mode that includes driving switches with a series of pulse sets during a drive interval and to not switch during an Off-interval. Configuring the circuit to adjust a number of pulse sets in a drive interval based on the equivalent frequency of a prior light load interval facilitates delivering sufficient power to the load while maintaining the light-load operating frequency to a value that is less than an audible frequency. Configuring the controller to adjust a number of non-switching intervals in the pulse set also assist in efficiently delivering the power to the load while maintaining the less than audible light-load operating frequency.

While the subject matter of the descriptions are described with specific preferred embodiments and example embodiments, the foregoing drawings and descriptions thereof depict only typical and non-limiting examples of embodiments of the subject matter and are not therefore to be considered to be limiting of its scope, it is evident that many alternatives and variations will be apparent to those skilled in the art. As will be appreciated by those skilled in the art, the example form of system 50 and circuit 85 are used as a vehicle to explain the operation method of forming the light-load operating mode. Circuit 85 may have other embodiments that operate in fly-back configuration, such as for example an active clamp flyback configuration, to switch the LLC circuit instead of transistors 78 and 82. Another embodiment of circuit 85 may be configured to operate the transistor(s) as another type resonant mode system, such as for example a Quasi-resonant operating configuration, instead of an LLC system. Although the operation of the light-load operating mode, such as for the operation of circuit 102 and/or comparators 118-121 and the FB threshold levels for comparators 118-121 are described as using the FB signal as representative of the output voltage to define or initiate or terminate the different light-load operations, those skilled in the art will understand that a different output parameter may be used instead of the value of the output voltage, for example an output parameter that is representative of the amount of power delivered to the load, such as to load 62, may be used instead of the output voltage for controlling operation in the light-load operating mode and the steps of such method. Although the FB signal as representative of the output voltage could still be used as the signal for operating circuit 86 and the control of transistors 78 and 82 in the normal resonant operating mode. One example of a circuit for detecting the amount of power delivered to the load is described in U.S. Pat. No. 9,520,795 issued to inventors Stuler et al. on Dec. 13, 2016, which is hereby incorporated herein by reference. The subject matter has been described for operating MOS transistors, although the subject matter is directly applicable to other MOS transistors, as well as to bipolar, BiCMOS, metal semiconductor FETs (MESFETs), HFETs, and other transistors.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A method of forming a resonant mode power supply control circuit comprising:

configuring the resonant mode power supply control circuit to switchingly control a high-side transistor and a low-side transistor to regulate an output voltage delivered to a load wherein the high-side transistor and the low-side transistor both have a current conducting electrode coupled together at a half-bridge node wherein the half-bridge node is configured for coupling to an inductor;

configuring a switching control circuit to form one or more drive signals to switch the high-side transistor and the low-side transistor in a normal operating mode in response to a first value of the output voltage and to control the high-side and low-side transistors in a light-load operating mode in response to a second value of the output voltage wherein the first value is greater than the second value and wherein the switching control circuit forms the light-load operating mode to include one or more sequences of a drive interval wherein the one or more drive signals are formed to switch the high-side and low-side transistors, followed by an Off-interval wherein the high-side and low-side transistors are not switched;

configuring a light-load control circuit to generate a drive pattern having one or more pulse sets wherein each pulse set is formed to enable the low-side transistor for a substantially fixed time interval, subsequently enable the high-side transistor for a second time interval determined by the output voltage, and subsequently enable the low side transistor for a third time interval formed to be one of proportional to the second time interval or in response to a substantially zero value of a current sense signal; and configuring the light-load control circuit to measure a duration of the drive interval and the Off-interval and to adjust a number of pulse sets in a subsequent drive pattern for a subsequent drive interval in response to the duration.

2. The method of claim 1 including configuring the light-load control circuit to adjust the number of pulse sets for an immediately subsequent drive interval.

3. The method of claim 1 including configuring the light-load control circuit to increase the number of pulse sets in the subsequent drive interval in response to the duration having a value less than a Light-Load Threshold value.

4. The method of claim 1 further including configuring the light-load control circuit to detect peaks and valleys of an HB signal formed at the half-bridge node and to generate a non-switching time interval between two adjacent pulse sets wherein the non-switching time interval is substantially equal to one or more cycles of a peak-to-valley oscillation of the HB signal.

5. The method of claim 1 further including configuring the light-load control circuit to form a non-switching interval between pulse sets by counting one or more peaks and valleys formed by an HB signal formed at the half-bridge node in response to the one or more pulse sets.

6. The method of claim 1 further including configuring the light-load control circuit to adjust a number of non-switching intervals between pulse sets in response to a duration of one of the drive interval or the Off-interval.

7. The method of claim 6 further including configuring the light-load control circuit to increase the number of non-switching intervals between pulse sets in response to the Off-interval having a duration greater than an Off-threshold value.

8. The method of claim 6 further including configuring the light-load control circuit to decrease the number of non-switching intervals between pulse sets in response to the drive interval having a duration greater than a Drive-threshold value.

9. The method of claim 1 including configuring the light-load control circuit to inhibit initiating the light-load operating mode for a blanking time interval in response to the output voltage increasing from near the second value to a third value that is less than the first value and greater than the second value.

10. The method of claim 1 including configuring the light-load control circuit to form the drive pattern as a digital word that represents a pulse set of the one or more pulse sets.

11. A circuit for controlling a light-load operation of a resonant converter circuit comprising:

the resonant converter circuit configured to drive one or more transistors connected to an inductor to control a current through the inductor and form an output voltage to a load wherein the inductor and the one or more transistors are connected together at a bridge node wherein a bridge signal is formed at the bridge node by switching of the one or more transistors;

a pulse set generator circuit configured to form a digital representation of a pulse set for operating the one or more transistors including forming the pulse set to cause switching of the one or more transistors at least once;

a drive pattern circuit configured to form a drive signal to switchingly drive the one or more transistors during a drive interval with a repeated sequence of the pulse set in response to an output parameter of one of the output voltage or power delivered to the load being no greater than a first value and greater than a second value that is less than the first value;

the drive pattern circuit configured to form an Off-interval of the drive signal by not switching the drive signal in response to the output parameter being no greater than the second value and to subsequently switchingly drive the one or more transistors in response to the output parameter being greater than a third value wherein the third value is less than the first value and greater than the second value; and the pulse set generator circuit configured to form one or more non-switching intervals between each pulse set in response to a duration of one of the drive interval or the Off-interval.

12. The circuit of claim 11 wherein the pulse set generator circuit is configured to form the one or more non-switching intervals in response to a duration of the drive interval and in response to a duration of the Off-interval.

13. The circuit of claim 11 wherein the pulse set generator circuit is configured to adjust a number of the non-switching intervals for each drive interval.

14. The circuit of claim 11 further including a detector circuit to detect one of peaks or valleys of the bridge signal, and wherein the pulse set generator circuit is configured to form the one or more non-switching intervals to be substantially equal to one or more periods of the bridge signal.

15. The circuit of claim 14 wherein the peaks or valleys of the bridge signal are formed in response to driving the one or more transistors with the pulse set.

16. The circuit of claim 11 further including a measurement circuit configured to measure a duration of the drive interval and the Off-interval wherein the measurement circuit is configured to increase a number of pulse sets in the drive interval in response to the duration having a value equivalent to a frequency of no less than approximately 800 kHz.

17. A method of forming a resonant converter circuit comprising:
- configuring a light-load control circuit to, during a light-load operating mode, control driving of one or more transistors to form an output parameter of one of an output voltage for a load or power delivered to the load wherein the one or more transistors are connected to an inductor at a switch node;
- configuring the light-load control circuit to form a sequence to control the one or more transistors wherein the sequence includes a drive interval having a drive pattern and a subsequent Off-interval wherein the one or more transistors are switched with the drive pattern during the drive interval and are not switched during the Off-interval; and
- configuring a first circuit of the light-load control circuit to form the drive pattern as a repeated sequence of a pulse set that sequentially enables the one or more transistors with a base set followed by a number of non-switching intervals wherein each non-switching interval is a period of a signal received from the switch node in response to driving the one or more transistors with the base set.

18. The method of claim 1 including configuring the light-load control circuit form the pulse set to sequentially enable the one or more transistors at least once.

19. The method of claim 17 including configuring the light-load control circuit to form the number of non-switching intervals in response to a duration of the drive interval or a duration of the Off-interval.

20. The method of claim 17 including configuring the light-load control circuit to form a number number of the pulse sets in the drive pattern in response to a duration of an immediately previous sequence.

* * * * *